US012535538B2

United States Patent
Yang

(10) Patent No.: US 12,535,538 B2
(45) Date of Patent: Jan. 27, 2026

(54) ACTIVE DETECTION OF AN ARC FAULT

(71) Applicant: Siemens Industry, Inc., Alpharetta, GA (US)

(72) Inventor: Guang Yang, Johns Creek, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 258 days.

(21) Appl. No.: 18/448,451

(22) Filed: Aug. 11, 2023

(65) Prior Publication Data

US 2025/0052833 A1   Feb. 13, 2025

(51) Int. Cl.
*G01R 31/52* (2020.01)

(52) U.S. Cl.
CPC ................... *G01R 31/52* (2020.01)

(58) Field of Classification Search
CPC ...... H02H 1/0015; H02H 1/0023; H02H 3/00; G01R 31/50; G01R 31/52
See application file for complete search history.

(56) References Cited

U.S. PATENT DOCUMENTS

| | | | |
|---|---|---|---|
| 2020/0366079 A1* | 11/2020 | Telefus | H02J 13/00022 |
| 2021/0305801 A1* | 9/2021 | Kinsel | H02H 3/08 |
| 2022/0247163 A1* | 8/2022 | Leidy | G01R 31/1272 |

FOREIGN PATENT DOCUMENTS

| | | |
|---|---|---|
| EP | 2395619 B1 | 9/2017 |
| EP | 3072198 B1 | 9/2022 |
| WO | 2022044626 A1 | 3/2022 |

OTHER PUBLICATIONS

Guang Yang et al., "Instabilities in the anode region of atmospheric pressure arc plasmas", Plasma Sources Science and Technology, Department of Mechanical Engineering, University of Minnesota, Minneapolis, MN, Sep. 7, 2007, 9 pages.

* cited by examiner

*Primary Examiner* — Lee E Rodak
*Assistant Examiner* — Demetrius R Pretlow

(57) ABSTRACT

A circuit breaker for active detection of an arc fault comprises a controller and an actuator. The controller monitors a load current of one or more devices connected to the circuit breaker. The controller detects an arc-like signal in the load current and decreases power temporarily to the connected device(s) for a temporary period of time in response to detecting the arc-like signal in the load current. The controller determines whether the arc-like signal is present in the load current while the power is decreased. The actuator inactivates the load current in response to the controller determining that the arc-like signal is not present in the load current while the power is decreased.

20 Claims, 2 Drawing Sheets

ACTIVE DETECTION OF AN ARC FAULT

FIELD OF THE INVENTION

This application relates to the field of arc-fault circuit interrupters ("AFCIs") and, more particularly, to methods for detecting arc faults by solid-state circuit breakers.

BACKGROUND

Circuit breakers are essential for electrical safety. They feed current to connected loads, and interrupt the circuit when a circuit fault, such as overload, short circuit, ground fault, and arc fault, is detected.

An arc fault is an unintentional arc created by current flowing through an unintended path in a circuit. An arc-fault circuit interrupter ("AFCI") detects arc faults by measuring the circuit and monitoring patterns that indicate the occurrence of an arc fault. The AFCI can detect the unique signal of the arc fault in the electrical wire and automatically trip the circuit breaker to cut the power. One holdback of AFCIs is nuisance tripping with noisy loads. Such situations create inconveniences for customers and need to be addressed to fully realize the benefits of AFCIs.

Conventional AFCIs implement a passive approach to arc fault detection. They process received signals of the circuit either, in time domain or frequency domain, to extract certain features. These features are then used to make decisions on whether an arc presents or not. In this manner, conventional breakers detect in a passive way, in which the breaker waits for the arc to show up, waits for the arc to provide the high frequency signal, and analyzes the signal to determine whether an arc fault exists. Many decision-making methods for reducing nuisance tripping have been developed, including machine learning based artificial intelligence methods. These advanced algorithms are somewhat effective in reducing nuisance tripping but still lack efficient performance and cost.

SUMMARY

In accordance with one embodiment of the disclosure, there is provided an active approach for arc fault detection by a circuit breaker in contrast to the passive approaches of convention devices. The active approach checks a connected circuit before tripping the corresponding AFCI, hence reducing the chance of nuisance tripping.

One aspect is a circuit breaker for active detection of an arc fault comprising a controller and an actuator coupled to the controller. The controller monitors a load current of one or more devices connected to the circuit breaker. The controller detects an arc-like signal in the load current and decreases power temporarily to the connected device or devices for a temporary period of time in response to detecting the arc-like signal in the load current. The controller determines whether the arc-like signal is present in the load current while the power is decreased. The actuator inactivates the load current in response to the controller determining that the arc-like signal is not present in the load current while the power is decreased.

Another aspect is a method of a circuit breaker for active detection of an arc fault. A load current of one or more devices connected to the circuit breaker is monitored. An arc-like signal in the load current is detected. Power to the connected device or devices is decreased temporarily for a temporary period of time in response to detecting the arc-like signal in the load current. Decreasing the power temporarily to the connected device or devices includes determining whether the arc-like signal is present in the load current while the power is decreased. The load current is inactivated in response to determining that the arc-like signal is not present in the load current while the power is decreased.

Yet another aspect is a method of a circuit breaker for active detection of an arc fault. A load current of one or more devices connected to the circuit breaker is monitored. An arc-like signal in the load current is detected. Power to the connected device(s) is decreased temporarily in response to detecting the arc-like signal in the load current. The power to the connected device(s) is restored after a temporary period of time after decreasing the power to the connected device(s). A temporary period signal in the load current is captured subsequent to decreasing the power temporarily to the connected device(s) and prior to restoring the power to the connected device(s). Whether the arc-like signal is present in the temporary period signal is determined. The load current is inactivated in response to determining that the arc-like signal is not present in the load current.

The above-described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
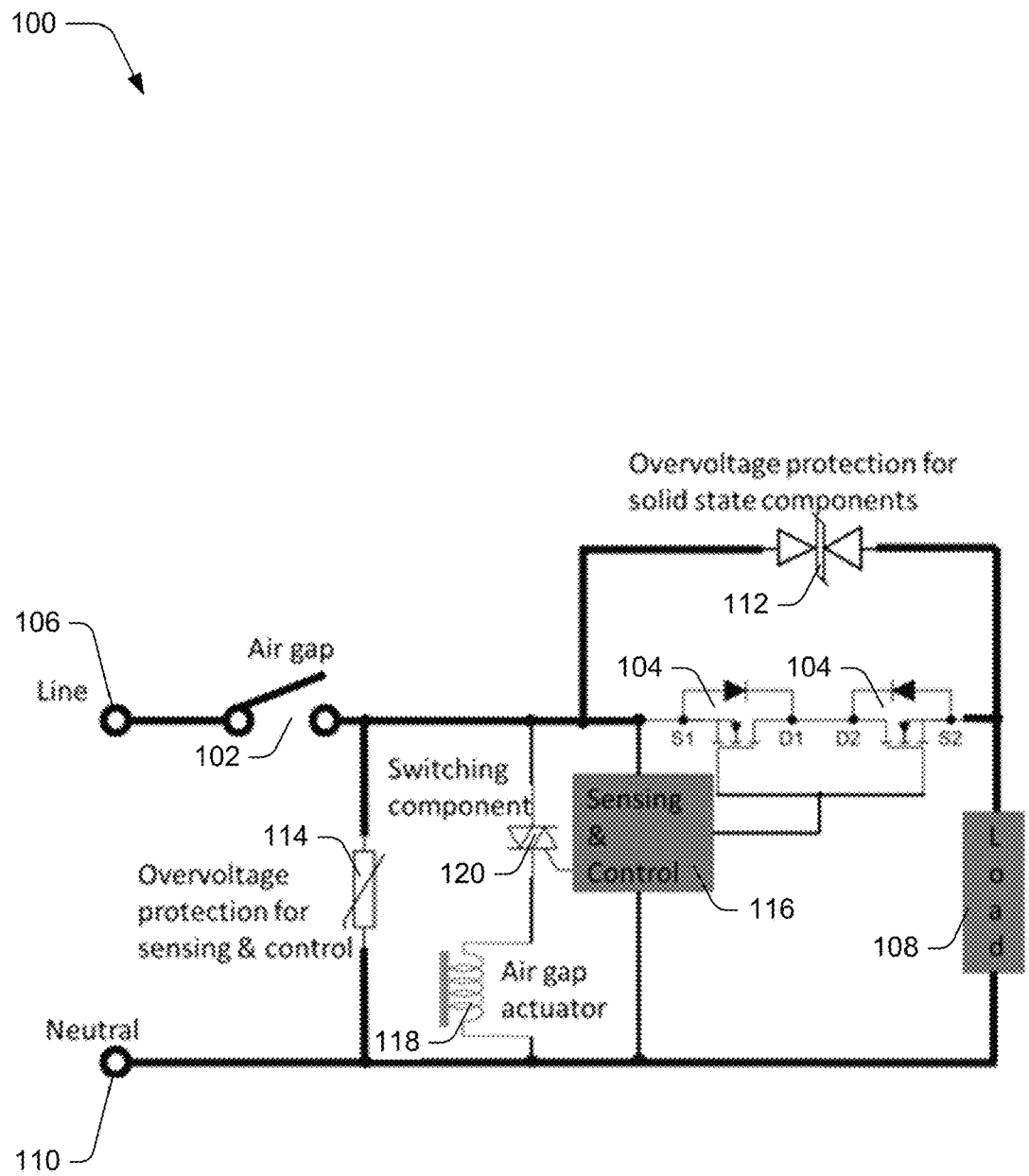
FIG. 1 is a block diagram of a solid-state circuit breaker in an example implementation that is operable to employ techniques described herein.

Various technologies that pertain to systems and methods that facilitate active detection of an arc fault by a circuit breaker will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments. Arc have several physical phenomena present at the same time, all of which are important for sustaining an arc.

These phenomena have significant different time scales, from microseconds to tens of milliseconds, which is represented by a characteristic time of the physical process of the phenomena. An important part of forming an arc comes from the process of electron heating, which happens in the order of about one microsecond. Therefore, any current change longer than a microsecond may have effects on the arc characteristics. As for a connected device having a noisy load that may create nuisance tripping of the circuit breaker, such devices often use switching power supplies and capacitors, which typically hold charges for tens of milliseconds for energy discharge. The timing difference between an arc forming (microseconds) and switching power supplies (tens of milliseconds) is leveraged by the circuit breaker and its operation.

Referring to FIG. 1, there is shown a solid-state circuit breaker in accordance with the techniques described herein. Although the circuit breaker shown in FIG. 1 represents a first single pole 120V, 20 A solid-state circuit breaker, it is to be understood that the techniques described herein may be utilized by a wide variety of fast, responsive circuit breakers and are not limited to the specific circuit breaker shown. For example, in general, solid-state circuit breakers in particular may be implemented in active arc fault detection, due to their fast-switching capabilities, and offer more controllability that conventional devices, such as thermal-magnetic circuit breakers.

The circuit breaker 100 includes an isolation 102, such as a switch, and power electronic components 104. As shown in FIG. 1, the isolation 102 may be placed in series with the power electronic components 104, such as in front of solid-state components as illustrated. For some embodiments, each power electronic component 104 may be a MOSFET (metal-oxide-semiconductor field effect transistors), and the isolation 102 may be an air gap. Two MOSFETS may be provided in a back-to-back configuration for an AC line.

When current is received from the line 106, the current flows through the isolation 102 and through the power electronic components 104. The circuit is connected to a load 108, and the current flow returns to neutral 110. In response to detecting a fault of the circuit, the power electronic components 104 may be switched off, and then the isolation 102 opens to inactivate current flow. For embodiments that utilize a solid-state circuit breaker, the current load may be switched on and off in the order of about 10 microseconds as opposed to, for example, a traditional thermal-magnetic circuit breaker in the order of 10 milliseconds. Also, the resistance of the circuit breaker 100 may be controlled, hence changing the load current characteristics, by controlling the gate voltage to the power electronic components 104. Accordingly, the circuit breaker 100 provides active detection of arc fault due to its capabilities of fast switching and controllable load current characteristics.

The circuit breaker 100 includes a first overvoltage protection 112 to protect the power electronic components 104 during a shut off, since the shut off occurs very quickly for the circuit breaker. Without the first overvoltage protection 112, the inductance in the load 108 ay kick back and give some kind of high voltage that may damage the power electronic components 104. The first overvoltage protection 112 absorbs the inductor kickback to protect the power electronic components 104.

The circuit breaker 100 further includes a second overvoltage protection 114 between the line 106 and the neutral 110 for protecting control circuitry, such as a controller 116. The second overvoltage protection 114 may absorb any surge from a sudden, high spike of voltage. In this manner, the second overvoltage protection 114 protects the controller 116, such as a sensing and control circuit, from pulling in the surge. The second overvoltage protection 114 absorb that kind of a spike. The circuit breaker 100 further includes activation circuitry, or actuator 118, 120, for controlling the isolator 102, such as opening an air gap to protect the circuit. The actuator 118, 120 includes an air gap actuator 118 and a switching component 120 between the line 106 and the neutral 110, parallel to the second overvoltage protection 114. The switching component is controlled by the controller 116, which the main circuitry of the circuit breaker 100. The controller 116 senses the current and the condition of the circuit breaker 100 and then controls the power electronic components 104 and/or the isolation 102 to be activated or deactivated.

When the circuit breaker 100 detects an arc fault, the circuit breaker trips. The controller 116 identifies the arc fault by detecting a high frequency signal that is generated by the arc. The circuit breaker 100 includes switching components having fast reaction times, such a solid-state circuit breaker having a solid-state switching component. The switching components of the circuit breaker 100 may temporarily decrease operation by inactivating the power electronic component(s) 104 or increasing the resistance of the power electronic component(s). For example, the resistance may be increased by reducing the gate voltage of the power MOSFET. The temporarily decreased operation results in a short dip of voltage or current, such as a time frame of about 10 microseconds. The arc will be impacted quickly by the decreased power since the collection of particles and the electric field of the arc are directly energized by the power. As a result, the signature of the load current should change, but everything downstream (including the connected devices) should still operate without disruption by the capacitor, of a switching power supply, for energy discharge that is built-in to each connected device.

Figure 2:
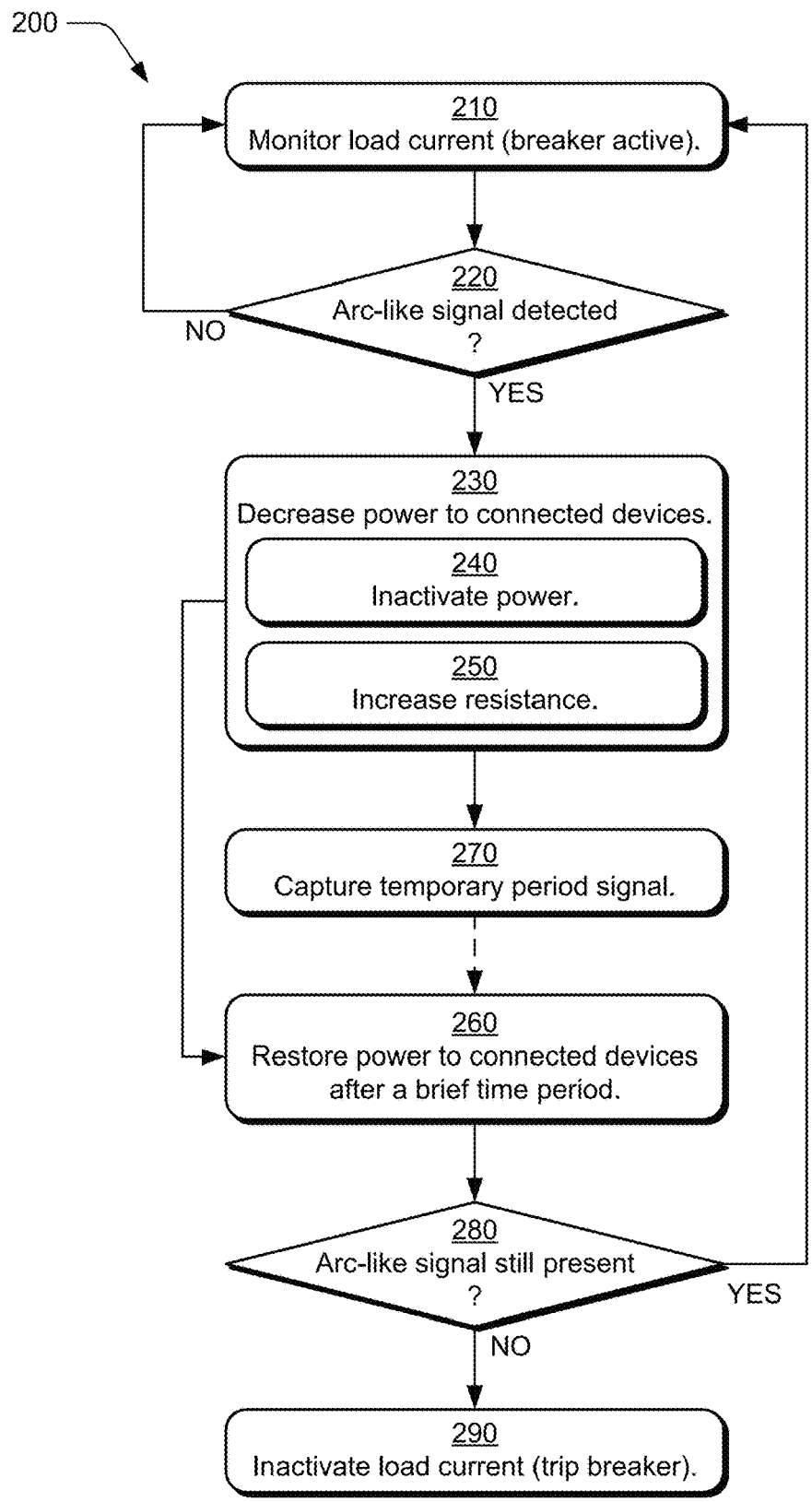
FIG. 2 is a flow diagram of an operation of the controller of FIG. 1 in an example implementation for active detection of an arc fault.

Referring to FIG. 2, there is shown an example operation 200 of a circuit breaker 100 for active detection of an arc fault. The controller 116 monitors (210) a load current of one or more devices connected to the circuit breaker. The controller 116 then determines (220) whether an arc-like signal is detected in the load current. If an arc-like signal is not detected (220), then the controller 116 continues to monitor (210) the load current.

In response to detecting (220) an arc-like signal in the load current, the controller 116 decreases (230) power temporarily to the connected device or devices for a temporary period of time. The controller 116 decreases (230) the power to the device(s) temporarily and determines whether the arc-like signal is present in the load current while the power is decreased. This operation 200 works well with circuit breakers 100 that may interrupt currents very quickly, such as semiconductor-based devices, particularly solid-state circuit breakers. For some embodiments, the power is decreased (230) temporarily to the connected device(s) for a temporary period of time by a solid-state switching component. For some embodiments, the power is decreased (230) temporarily to the connected device(s) by inactivating (240) the power temporarily to the connected device(s) for the temporary period of time. For example, in response to a trip signal from the controller, the actuator inactivates (240) the load current in response to determining that the arc-like signal is not present in the load current while the power is decreased. For some embodiments, the power is decreased temporarily to the connected device(s) by increasing (250) a resistance of the circuit breaker for the temporary period of time.

For example, during operations, a solid-state circuit breaker may temporarily reduce gate voltage to the power electronic components for a time duration longer than electron heating of the arc but less than energy discharge (i.e., capacitor discharge of a switching power supply) of the connected device or devices, such as 100 microseconds. The reduction in gate voltage may result in higher resistance of power electronics and hence reduce load current. With a duration of 100 microseconds, the faster reacting arcs will become weaker or distinguished but the slower reacting switching power supplies of the connected devices will not change their noise characteristics. Solid-state circuit breaker may realize an active detection of arcs, whereby sending a current modification for a selected duration since different responses from the circuit are expected with and without arcs. Also, this type of active detection may be realized by solid-state based technologies in which switching timing and load current may be controlled in small scales. This active detection method can be used on its own or in combination with existing passive detection methods, where it serves as a confirmation before circuit breaker trip.

For some embodiments, the controller 116 may decrease (230) power temporarily to one or more connected devices in response to detecting (220) the arc-like signal in the load current. After a brief, temporary period of time, the controller 116 may restore (260) the power to the connected device or devices after a temporary period of time after decreasing (230) the power to the connected device or devices. The temporary period of time is from the time of decreasing (230) the power to the time of restoring (260) the power. The controller 116 captures (270) a temporary period signal in the load current during this temporary period of time, i.e., subsequent to decreasing (230) the power temporarily to the connected device(s) and prior to restoring (260) the power to the connected device(s). The controller 116 then determines (280) whether the arc-like signal is present in the temporary period signal.

For some embodiments, the predetermined period of time is less than a time period of energy discharge for at least one connected device. The duration of the predetermined period of time is longer than electron heating of the arc but less than capacitor discharge of a switching power supply (i.e., energy discharge) of the connected device or devices. For some embodiments, the predetermined period of time is based on a characteristic time of a physical process for an arc to generate. For example, physical processes that influence the generation time of an arc include electron heating and/or ionization. For some embodiments, the predetermined period of time is no greater than one hundred microseconds. For some embodiments, the predetermined period of time is no greater than ten microseconds.

In reference to detection of arc-like signals before and after the predetermined periods of time (220, 280), the signals are substantially similar and the detection analyses for arc faults are generally the same. The load current is monitored the temporary period signal by analyzing, at least in part, multiple features in order to make a decision on arc faults.

In response to determining (280) that the arc-like signal is still present in the temporary period signal of the load current, then the controller 116 continues to monitor (210) the load current as the circuit breaker 100 remains active. In response to determining (280) that the arc-like signal is not present, then the controller 116 inactivates (290) the load current by tripping the circuit breaker 100.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A circuit breaker for active detection of an arc fault comprising:
   a controller of the circuit breaker configured to monitor a load current of at least one device connected to the circuit breaker, the controller detecting an arc-like signal in the load current and decreasing power temporarily to the at least one connected device for a temporary period of time in response to detecting the arc-like signal in the load current, the controller determining whether the arc-like signal is present in the load current while the power is decreased; and
   an actuator of the circuit breaker coupled to the controller, the actuator configured to inactivate the load current in response to the controller determining that the arc-like signal is not present in the load current while the power is decreased.

2. The circuit breaker as described in claim 1, further comprising a solid-state switching component associated with the controller configured to decrease the power temporarily.

3. The circuit breaker as described in claim 1, wherein the controller is configured to inactivate the power temporarily to the at least one connected device for the temporary period of time.

4. The circuit breaker as described in claim 1, wherein the controller is configured to increase a resistance of the circuit breaker for the temporary period of time.

5. The circuit breaker as described in claim 1, wherein the predetermined period of time is less than a time period of energy discharge for at least one connected device.

6. The circuit breaker as described in claim 1, wherein the predetermined period of time is based on a characteristic time of a physical process for an arc to generate.

7. The circuit breaker as described in claim 1, wherein the predetermined period of time is no greater than one hundred microseconds.

8. A method of a circuit breaker for active detection of an arc fault, the method comprising:
monitoring a load current of at least one device connected to the circuit breaker;
detecting an arc-like signal in the load current;
decreasing power temporarily to the at least one connected device for a temporary period of time in response to detecting the arc-like signal in the load current;
determining whether the arc-like signal is present in the load current while the power is decreased within the temporary period of time; and
inactivating the load current in response to determining that the arc-like signal is not present in the load current while the power is decreased.

9. The method as described in claim 8, wherein decreasing power temporarily to the at least one connected device for a temporary period of time includes decreasing the power temporarily by a solid-state switching component.

10. The method as described in claim 8, wherein decreasing the power temporarily to the at least one connected device includes inactivating the power temporarily to the at least one connected device for the temporary period of time.

11. The method as described in claim 8, wherein decreasing the power temporarily to the at least one connected device includes increasing a resistance of the circuit breaker for the temporary period of time.

12. The method as described in claim 8, wherein the predetermined period of time is less than a time period of energy discharge for at least one connected device.

13. The method as described in claim 8, wherein the predetermined period of time is based on a characteristic time of a physical process for an arc to generate.

14. The method as described in claim 8, wherein the predetermined period of time is no greater than one hundred microseconds.

15. A method for active detection of an arc fault, the method comprising:
monitoring, at a circuit breaker, load current of at least one device connected to the circuit breaker;
detecting an arc-like signal in the load current;
decreasing power temporarily to the at least one connected device in response to detecting the arc-like signal in the load current;
restoring the power to the at least one connected device after a temporary period of time after decreasing the power to the at least one connected device;
capturing a temporary period signal in the load current subsequent to decreasing the power temporarily to the at least one connected device and prior to restoring the power to the at least one connected device;
determining whether the arc-like signal is present in the temporary period signal; and
inactivating the load current in response to determining that the arc-like signal is not present in the load current.

16. The method as described in claim 15, wherein decreasing power temporarily and restoring the power includes decreasing the power temporarily and restoring the power by a solid-state switching component.

17. The method as described in claim 15, wherein decreasing the power temporarily to the at least one connected device includes inactivating the power temporarily to the at least one connected device for the temporary period of time.

18. The method as described in claim 15, wherein decreasing the power temporarily to the at least one connected device includes increasing a resistance of the circuit breaker for the temporary period of time.

19. The method as described in claim 15, wherein the predetermined period of time is less than a time period of energy discharge for at least one connected device.

20. The method as described in claim 15, wherein the predetermined period of time is based on a characteristic time of a physical process for an arc to generate.

* * * * *